US012033074B2

(12) United States Patent
Das et al.

(10) Patent No.: US 12,033,074 B2
(45) Date of Patent: Jul. 9, 2024

(54) VERTICAL FEDERATED LEARNING WITH COMPRESSED EMBEDDINGS

(71) Applicants: International Business Machines Corporation, Armonk, NY (US); RENSSELAER POLYTECHNIC INSTITUTE, Troy, NY (US)

(72) Inventors: Anirban Das, Albany, NY (US); Timothy John Castiglia, Troy, NY (US); Stacy Elizabeth Patterson, Troy, NY (US); Shiqiang Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 17/330,340

(22) Filed: May 25, 2021

(65) Prior Publication Data

US 2022/0383091 A1      Dec. 1, 2022

(51) Int. Cl.
*G06N 3/008*       (2023.01)
*G06F 18/214*    (2023.01)
(Continued)

(52) U.S. Cl.
CPC ............. *G06N 3/08* (2013.01); *G06F 18/214* (2023.01); *G06F 18/23213* (2023.01); *H04L 67/10* (2013.01)

(58) Field of Classification Search
CPC . G06F 18/214; G06F 18/23213; G06N 20/00; G06N 3/045; G06N 3/063;
(Continued)

(56) References Cited

U.S. PATENT DOCUMENTS

2013/0290222 A1* 10/2013 Gordo ................. G06F 18/2155
707/769
2021/0073678 A1    3/2021 Chu
(Continued)

OTHER PUBLICATIONS

Feng, Siwei et al., "Multi-Participant Multi-Class Vertical Federated Learning," arXiv preprint arXiv:2001.11154, Jan. 30, 2020, 7 pages.
(Continued)

*Primary Examiner* — June Sison
(74) *Attorney, Agent, or Firm* — Caleb Wilkes; Otterstedt & Kammer PLLC

(57) ABSTRACT

For a plurality of client computing devices of a federated learning system, obtain initial compressed embeddings, compressed by clustering, and including output of initial local models for a current minibatch, and initial cluster labels corresponding to the initial embeddings. Recreate an initial overall embedding based on the initial embeddings and the initial labels. At a server of the federated learning system, send a current version of a server model to each of the client computing devices; and obtain, from the client computing devices: updated compressed embeddings, compressed by clustering, and updated cluster labels corresponding to the updated embeddings. Based on local training by the plurality of clients with the overall embedding and the current server model, at the server, recreate an updated overall embedding based on the updated embeddings and the corresponding updated labels, and locally train the server model based on the updated overall embedding.

20 Claims, 9 Drawing Sheets

(51) Int. Cl.
*G06F 18/23213* (2023.01)
*G06N 3/08* (2023.01)
*H04L 67/10* (2022.01)

(58) Field of Classification Search
CPC .......... G06N 3/08; G06N 3/084; G06N 3/098; H04L 67/10; H04L 69/04
See application file for complete search history.

(56) References Cited

U.S. PATENT DOCUMENTS

| | | | | |
|---|---|---|---|---|
| 2022/0383132 | A1* | 12/2022 | Pastore | G06N 3/088 |
| 2023/0021563 | A1* | 1/2023 | Narayanam | G06F 21/6245 |
| 2023/0068386 | A1* | 3/2023 | Akdeniz | G06N 3/063 |
| 2023/0342655 | A1* | 10/2023 | Castiglia | H04L 41/145 |
| 2023/0351157 | A1* | 11/2023 | Namgoong | G06N 3/0455 |

OTHER PUBLICATIONS

Liu, Duowen, "Accelerating Intra-Party Communication in Vertical Federated Learning with RDMA," Proceedings of the 1st Workshop on Distributed Machine Learning, pp. 14-20, 2020.
ZOOM Introduces Contact Center Business Intelligence. Downloaded on Apr. 30, 2021. pages: 3 https://www.prnewswire.com/news-releases/zoom-introduces-contact-center-business-intelligence-connecting-data-silos-to-help-with-strategic-decision-making-300208551.html.
Qiang Yang, et al. Federated Machine Learning: Concept and Applications. ACM Trans. Intell. Syst. Technol., vol. 10, No. 2, Article 12. Publication date: Feb. 2019. Pages: 19.
Peter Mell and Timothy Grance, The NIST Definition of Cloud Computing, NIST Special Publication 800-145, Sep. 2011, cover, pages I-III and 1-3.
Qiang Yang et al., IEEE Federated Machine Learning White Paper, IEEE Jun. 2021 18 pages.

* cited by examiner

Algorithm 1 Vertical FL with server model and clustering for upstream compresssion 1: Initialize: $\theta_k^0$ for all clients k
2: Initialize: Server model $\theta_0^0$     *301*
3: for t=1,...,T do
4:    Randomly sample $B^t \in X$
5:    parallel for k = 1, ... , K do
6:      $\phi_k^{B^t} = h_k(\theta_k^t; B^t)$    ▷ Get output of local model
7:      Perform K-Means clustering on $\phi_k^{B^t}$    ▷ Compress upstream data
8:      Send clustered $\phi_k^{B^t}$ and cluster to server    ▷ Exchange embeddings
9:    end parallel for
10:    Server recreates $\phi_K^{B^t} = \{\phi_1^{B^t}, ..., \phi_K^{B^t}\}$ using cluster information
11:    Server send $\phi_K^{B^t}$ and $\theta_0^t$ to all clients
12:    parallel for k=1,...,k do
13:      Receive copy of $\phi_k$
14:      for q = 1,...,Q do
15:        $\phi_k^{B^t} = h_k(\theta_k^{t,q}; B^t)$    ▷ Get local embedding
16:        loss = loss_$fn$ $(\theta_0^t; \phi_1^{B^t}, ..., \phi_k^{B^t}, ..., \phi_K^{B^t}; y \in B^t)$    ▷ Loss calculation
17:        grad = $\theta_0^t$.get_grad(loss)    ▷ Calculate partial derivatives
18:        $\theta_0^{t,q+1} = \theta_0^{t,q}$.apply(grad)    ▷ Apply local gradients
19:      end for
20:      Perform K-Means clustering on $\phi_k^{B^t}$    ▷ Compress upstream data
21:      Send clustered $\phi_k^{B^t}$ and cluster labels to server
22:    end parallel for
23:    Server recreates updated $\phi_K^{B^t} = \{\phi_1^{B^t}, ..., \phi_K^{B^t}\}$ using cluster information
24:    for q=1,...,Q do
25:      loss = loss - $fn(\theta_0^{t,q}, \phi_k^{B^t}; y \in B^t)$    ▷ Loss calculation
26:      grad = $\theta_0^{t,q}$.get_grad(loss)    ▷ Calculate partial derivatives
27:      $\theta_0^{t,q+1} = \theta_0^{t,q}$.apply(grad)    ▷ Apply local gradients
28:    end for
29: end for

↓ *303*

Carry out federated machine learning inferencing with updated version of server model and updated local models

↓ *305*

Deploy information technology resources in accordance with inferencing

*FIG. 3*

VERTICAL FEDERATED LEARNING WITH COMPRESSED EMBEDDINGS

BACKGROUND

The present invention relates to the electrical, electronic and computer arts, and more specifically, to artificial intelligence, machine learning, and the like.

Federated learning is a machine learning technique for distributed model training from decentralized data. It has benefits such as preserving data privacy and reducing communication and storage requirements of the central cloud. Federated learning includes, for example, horizontal federated learning and vertical federated learning. In many practical applications of federated learning, features are vertically partitioned across multiple clients. For example, a bank and an insurance company have different information about the same person. The combination of such information can be used to predict the person's credit score and the like.

To perform federated learning on such vertically partitioned features, vertical federated learning (VFL) can be used. However, standard VFL approaches may incur high communications overhead, due to the need for communicating embeddings between clients and the server.

SUMMARY

Principles of the invention provide techniques for vertical federated learning with compressed embeddings. In one aspect, an exemplary method includes obtaining, for a plurality of client computing devices of a federated learning system: initial compressed embeddings, the initial compressed embeddings being compressed by clustering, the initial compressed embeddings including output of initial local models for a current minibatch, and initial cluster labels corresponding to the initial compressed embeddings. The method further includes recreating an initial overall embedding based on the initial compressed embeddings and the initial cluster labels obtained for the plurality of client computing devices; at a server of the federated learning system, sending a current version of a server model, to each of the plurality of client computing devices; and, at the server of the federated learning system, obtaining, from the plurality of client computing devices of the federated learning system: updated compressed embeddings, the updated compressed embeddings being compressed by clustering, and updated cluster labels corresponding to the updated compressed embeddings, based on local training by the plurality of client computing devices of the federated learning system with the initial overall embedding and the current server model. Even further steps include, at the server of the federated learning system, recreating an updated overall embedding based on the updated compressed embeddings and the corresponding updated cluster labels; and, at the server of the federated learning system, locally training the server model based on the updated overall embedding to obtain an updated version of the server model.

In another aspect, an exemplary federated learning system includes a memory embodying computer executable instructions, and at least one processor, coupled to the memory, and operative to execute the computer executable instructions to: obtain, for a plurality of client computing devices: initial compressed embeddings, the initial compressed embeddings being compressed by clustering, the initial compressed embeddings including output of initial local models for a current minibatch, and initial cluster labels corresponding to the initial compressed embeddings. The at least one processor is further operative to execute the computer executable instructions to: recreate an initial overall embedding based on the initial compressed embeddings and the initial cluster labels obtained from the plurality of client computing devices; send a current version of a server model to each of the plurality of client computing devices; and obtain, from the plurality of client computing devices: updated compressed embeddings, the updated compressed embeddings being compressed by clustering, and updated cluster labels corresponding to the updated compressed embeddings, based on local training by the plurality of client computing devices with the overall embedding and the current server model. The at least one processor is still further operative to execute the computer executable instructions to: recreate an updated overall embedding based on the updated compressed embeddings and the corresponding updated cluster labels; and locally train the server model based on the updated overall embedding to obtain an updated version of the server model.

In still another aspect, an exemplary computer program product includes one or more computer readable storage media, and program instructions collectively stored on the one or more computer readable storage media. The program instructions include: program instructions to obtain, for a plurality of client computing devices: initial compressed embeddings, the initial compressed embeddings being compressed by clustering, the initial compressed embeddings including output of initial local models for a current minibatch, and initial cluster labels corresponding to the initial compressed embeddings; program instructions to recreate an initial overall embedding based on the initial compressed embeddings and the initial cluster labels obtained from the plurality of client computing devices; program instructions to send a current version of a server model to each of the plurality of client computing devices; and program instructions to obtain, from the plurality of client computing devices: updated compressed embeddings, the updated compressed embeddings being compressed by clustering, and updated cluster labels corresponding to the updated compressed embeddings, based on local training by the plurality of client computing devices with the overall embedding and the current server model. The program instructions further include: program instructions to recreate an updated overall embedding based on the updated compressed embeddings and the corresponding updated cluster labels; and program instructions to locally train the server model based on the updated overall embedding to obtain an updated version of the server model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments provide one or more of:

improving the technological process of vertical federated machine learning by enhancing efficiency of communications between clients and server, thereby reducing data transfer overhead;

improving the technological process of operating an information technology (IT) infrastructure, such as a cloud-based IT infrastructure, by training a predictive federated learning model to predict future behavior and deploying IT resources in accordance with the predictions.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 presents an algorithm for clustered vertical federated learning, according to an aspect of the invention;

DETAILED DESCRIPTION

Figure 1:
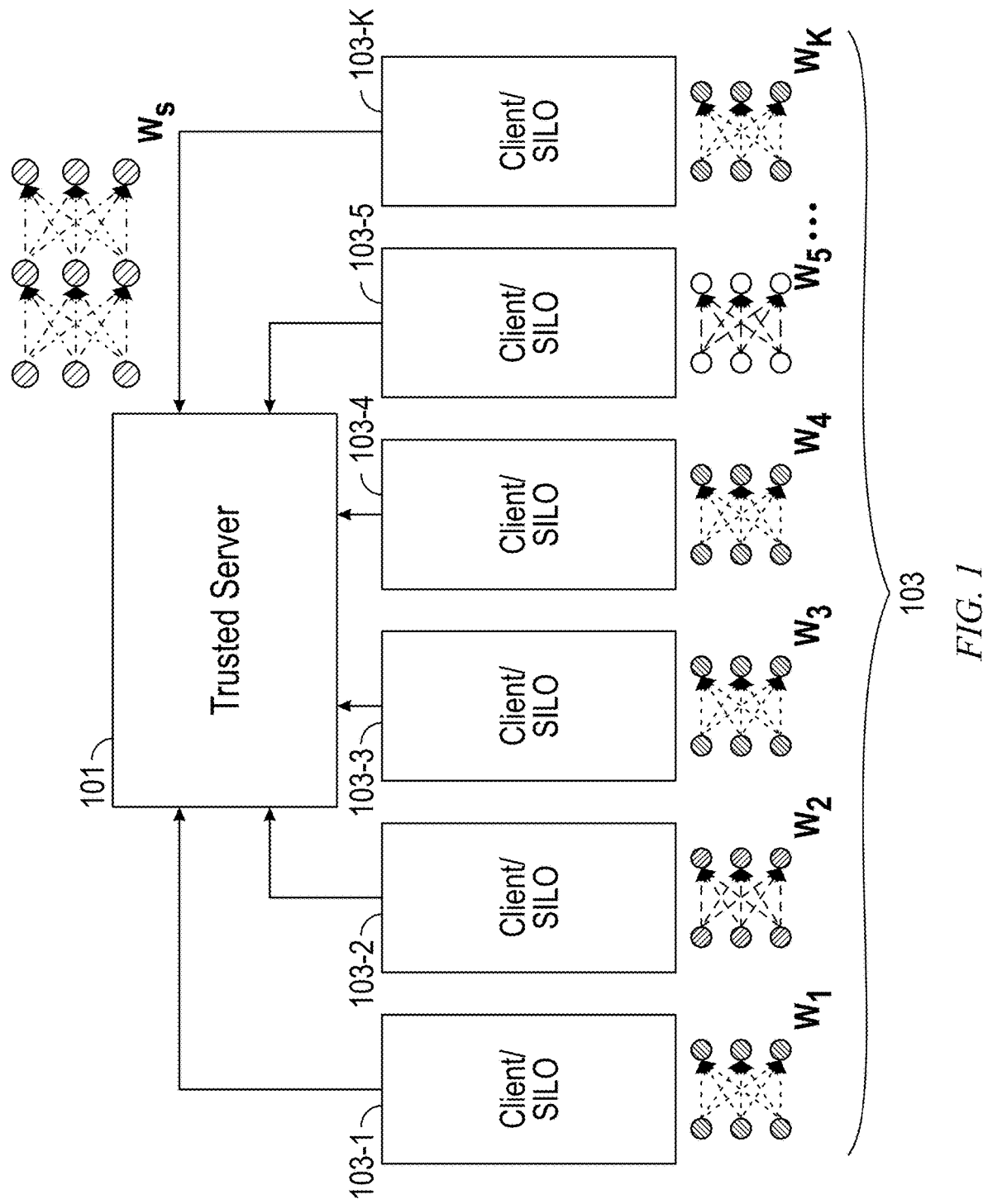
FIG. 1 illustrates a vertical federated learning environment wherein one or more embodiments of the invention can be employed.

As noted, standard VFL approaches may incur high communications overhead, due to the need for communicating embeddings between clients and the server. One or more embodiments advantageously make VFL communications more efficient. FIG. 1 illustrates a vertical federated learning environment wherein one or more embodiments of the invention can be employed. A plurality of clients/data silos 103-1, 103-2, 103-3, 103-4, 103-5, . . . , 103-K (collectively, 103) include vertically separated data; the silos/clients are employed to collaboratively train a federated model. A part of this model $W_S$ resides on trusted server 101; each client has its own model $W_1$, $W_2$, $W_3$, $W_4$, $W_5$, . . . , $W_K$. The features of the data generated in a first client/data silo are typically different than the features of the data generated in a second client/data silo. The models $W_1$, $W_2$, $W_3$, $W_4$, $W_5$, . . . , $W_K$ each form part of an overall model and each can be trained separately on the features of its corresponding client. The overall/federated model includes the portion $W_S$ residing on the trusted server 101 and the client models $W_1$, $W_2$, $W_3$, $W_4$, $W_5$, . . . , $W_K$.

Figure 2:
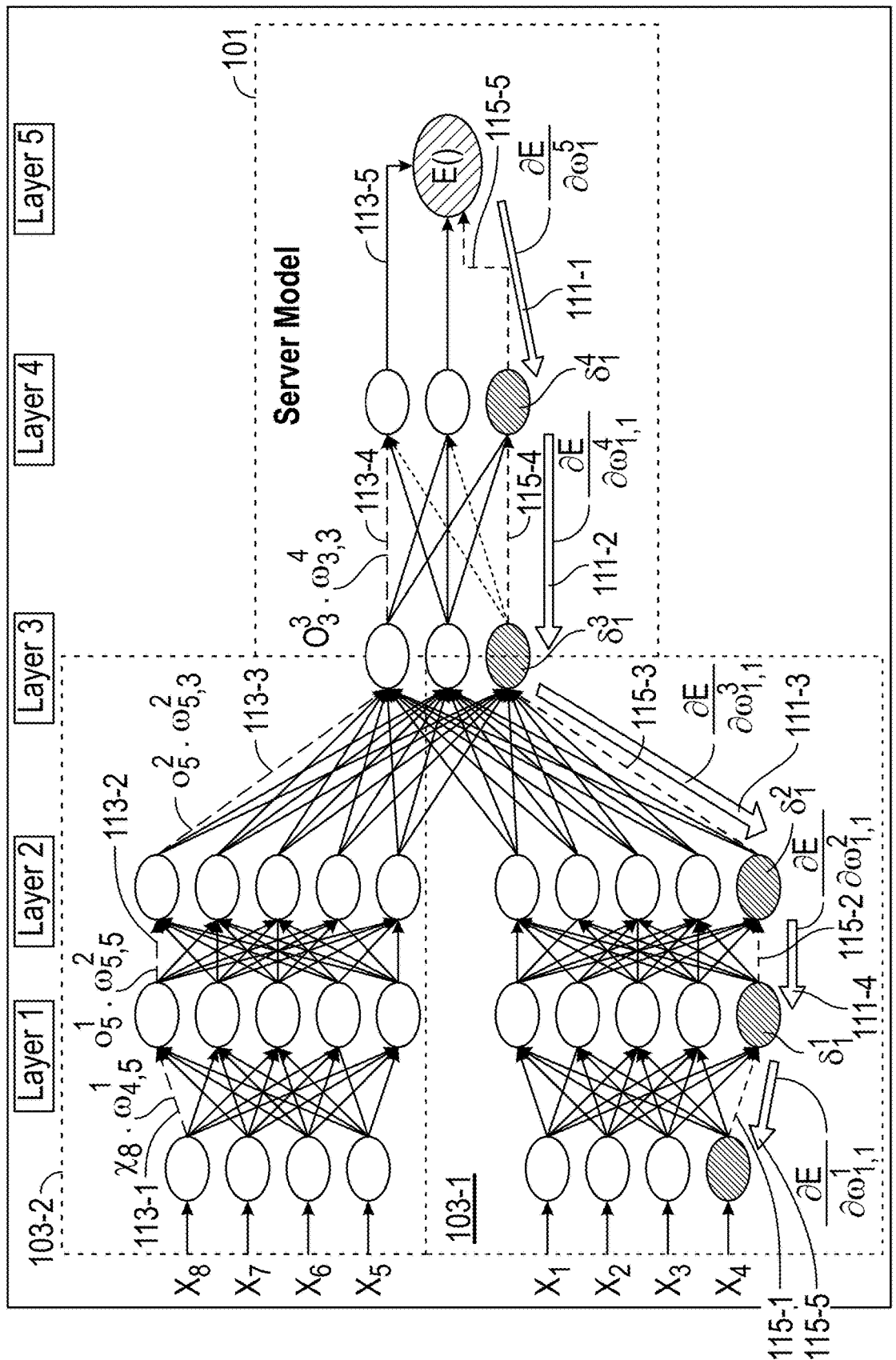
FIG. 2 presents a system overview, according to an aspect of the invention.

Refer now also to FIG. 2, which shows at least a portion of a federated model (e.g., two clients 103-1 and 103-2 (and thus two vertical partitions), and a single server 101). Different kinds of deep neural network models can be used. A fully connected network is shown as an example, but a convolutional neural network (CNN), long short-term memory (LSTM), or other type of network could be employed. The features are partitioned vertically across the clients 103, and the data samples have a shared key (for example, a numerical value unique to a person such as that person's social security number) and a shared label (e.g., a ground truth prediction result). For client 103-1, feed in features $x_1$, $x_2$, $x_3$, and $x_4$, while for client 103-2, feed in features $x_5$, $x_6$, $x_7$, and $x_8$. In one or more embodiments, mini-batch sampling across clients 103 is synchronized via the shared key. As will be appreciated by the skilled artisan, mini-batch gradient descent is a variation of the gradient descent algorithm that splits the training dataset into small batches that are used to calculate model error and update model coefficients. In one or more embodiments, in order to feed forward through the entire network, a minibatch is picked. The selected minibatch will contain some samples, which are synchronized across the clients. For example, all samples relate to the same person. As discussed, assume that the minibatch sampling can be synchronized using the shared key.

In the example of FIG. 2, the models for clients 103-1 and 103-2 each have three layers; the third layer of each client model also functions as the input layer to the server model. In each case, after the second layer, an embedding is generated. The embedding is fed into the first layer of the server model which is the third layer of the client models. The embeddings from the different clients are of the same dimensions and can therefore be summed. During forward propagation, the embeddings are forward propagated through the server model.

The model in the example of FIGS. 1 and 2 is split between clients 103 and the server 101. The client and server models can be trained simultaneously (using latent information) or alternatively. To train the server model $W_S$, embeddings obtained from the last layer's output of the client models are sent to the server in one or more embodiments. Note that the top neuron in layer 1 of the model for client 103-2 receives as input, inter alia, the weight assigned to the connection between the top input feature and top neuron in layer 1, $w_{4,5}^1$, multiplied by the feature $x_8$; the top neuron in layer 2 of the model for client 103-2 receives as input, inter alia, the weight assigned to the connection between the top neuron in layer 1 and the top neuron in layer 2, $w_{5,5}^2$, multiplied by the output of the top neuron in layer 1, $o_5^1$; and the top neuron in layer 3 receives as input, inter alia, the weight assigned to the connection between the top neuron in layer 2 and the top neuron in layer 3, $w_{5,3}^3$, multiplied by the output of the top neuron in layer 2, $o_5^2$. The top neuron in layer 4 receives as input, inter alia, the weight assigned to the connection between the top neuron in layer 3 and the top neuron in layer 4, $w_{3,3}^4$, multiplied by the output of the top neuron in layer 3, $o_3^4$.

Consider embeddings; the same are typically in the form of vectors. In the example of FIG. 2, $o_5^2$ times $w_{5,3}^3$ forms one of the numbers in the embedding vector sent to the server from client 103-2. As will be appreciated by the skilled artisan, embeddings can be used, for example, to reduce the dimensions of large, sparse matrices. Another embedding is sent to the server from client 103-1. The embeddings from each client are summed and fed forward through the server model. An output is obtained, for example, where classification is being carried out. Backward propagation is then carried out. E( ) represents the calculated loss at the end of the server model. The bold arrows 111-1, 111-2, 111-3, 111-4, 111-5 at the bottom of FIG. 2 show taking the gradient (partial derivative) of the loss with respect to the relevant set of weights during back propagation. The arrows 115-1, 115-2, 115-3, 115-4, 115-5 represent forward propagation for the client 103-1 (like the arrows 113-1, 113-2, 113-3, 113-4, 113-5 which represent forward propagation for the client 103-2, already discussed).

To train the client models $W_1, W_2, W_3, W_4, W_5, \ldots, W_K$, either the current server model can be sent and replicated at each client, or sample-specific information obtained at the first layer of the server model can be sent to clients during back propagation (the latter option is illustrated by arrow 111-3). In the former option, for example, client 103-1 is provided with a snapshot of the embeddings from client 103-2 and a snapshot of the server model. Client 103-1 can then carry out forward propagation through the entire network locally. Significant information exchange may be needed, and one or more embodiments make the procedure more communication-efficient. The bold arrows 111-1, 111-2, 111-3, 111-4, 111-5 at the bottom of FIG. 2 show the back propagation process wherein the gradient of the server model E is computed with respect to the corresponding weight 4, $w_{1,1}^4, w_{1,1}^3, w_{1,1}^2, w_{1,1}^1$ at each step.

Since the server model can calculate the loss, both forward propagation and backward propagation can be carried out. In one or more embodiments, the clients need to train their neural networks as well; however, they need a snapshot of the server model in order to undertake back propagation/enable local iteration. See arrow 111-3. Similarly, the clients send the server a snapshot of their embeddings, as discussed elsewhere herein.

In existing vertical federated learning approaches, the embedding of each data sample needs to be transmitted between clients 103 and the server 101, which can incur a high transmission overhead. To overcome this issue, one or more embodiments combine the embeddings of the data samples (e.g., those in a mini-batch) using a clustering approach. The cluster size can be determined based on the similarity of embeddings and their influence on further training (i.e., cluster size can be dynamically updated). For example, when features at a certain client are non-influential on the final prediction (e.g., all the embeddings from this client are the same or very similar), then it is sufficient to use a single vector to represent all the embeddings, i.e., the cluster size is 1. On the other hand, when features at a client are influential on the final prediction (i.e., the prediction result strongly depends on these features), the embeddings of different samples are likely to be very different, and it is appropriate to use a large cluster size.

The embeddings can also be compressed by only sending the difference (optionally, after quantization) compared to what was sent before. The clustering and compression methods can also be designed such that user privacy is preserved according to some pre-defined metric. K-means is a non-limiting example. Clustering is a form of vector quantization. The compressed model is sent from the server to the clients in one or more embodiments; i.e., in one or more embodiments, downstream communication is also compressed.

FIG. 3 presents pseudo-code for an exemplary algorithm 301 for vertical federated learning with a server model and clustering for upstream compression. In lines 1 and 2, the client and server models are initialized (t=0). The model for the $k^{th}$ client at time t=0 is designated as $\theta_k^0$. The server model at time t=0 is designated as $\theta_0^0$. The overall technique is repeated for time steps t=1 to T as per the FOR-NEXT loop from line 3 to line 29. In line 4, randomly sample a minibatch $B^t$ for the given time step, synchronized across the clients, and selected from the features X. From lines 5-9, in parallel, for each client k=1, K, obtain the output of the local model (line 6), compress the upstream data by k-means clustering or the like (line 7), and exchange the embeddings by sending the clustered embeddings and labels to the server (line 8). The symbol $\Phi_k^{B^t}$ represents the embedding for the minibatch $B^t$ found at client k using function $h_k$, based on the minibatch $B^t$ at time t and the model for the $k^{th}$ client at time t, $\theta_k^t$. The function $h_k$ is a shorthand for the output from the local neural network model, as will be appreciated by the skilled artisan.

Suppose the batch size is 50. There will be an embedding for each of the 50 data points. One or more embodiments apply clustering (k-means clustering is a non-limiting example as seen at line 7) on the embeddings to compress the upstream data. The k-means (or other) clustering can be modulated to obtain the desired number of centroids. The clustered set of embeddings and the cluster labels are then sent to the server. In the example of 50 data points, suppose 5 clusters were found as a result of the k-means (or other) clustering. The 5 cluster centroids and the cluster labels are sent to the server (line 8), rather than the entire 50 data points, advantageously reducing required communications bandwidth. The cluster labels are an output of the k-means (or other) clustering; e.g., a vector indicating that sample 1 belongs to cluster 1, sample 2 belongs to cluster 1, sample 3 belongs to cluster 2, and so on. There will be 50 entries for the 50 data points.

In line 10, the server recreates the overall model embeddings $\Phi_K^{B^t}$ from those for the individual clients $\Phi_1^{B^t} \ldots \Phi_K^{B^t}$ using the cluster information, and sends same, plus the updated server model $\theta_0^t$, to all the clients in line 11. The server re-forms the embedding matrix based on the centroids of the clusters; each cluster has a centroid and instead of sending each data point it is merely necessary to send what cluster each point belongs to and the center of that cluster. At the server, each data point in a cluster is replaced with the centroid for that cluster, in the re-forming. This reduces bandwidth because all that needs to be sent are the centroids and data point labels. Each client carries out multiple iterations of local training in one or more embodiments, but only engages in external communication periodically. However, in one or more embodiments, because the features are distributed, the clients need information (embeddings from the other clients and snapshot of the server model) from the other silos/clients in order to allow the local iterations. The server obtains the (clustered) information from the individual clients, recreates the overall embeddings and in line 11, sends same back to the individual clients, together with the server model for time t, to facilitate this process.

At this point, the clients have all the information they need to carry out local training for some number of iterations, Q. From lines 12-22, in parallel, each client receives its copy of the overall embeddings $\Phi_K$ in line 13, and then, in the FOR-NEXT loop from lines 14-19, for q=1 to Q, obtains the local embedding $\Phi_k^{B^t}$ in line 15 (without communication with the server), using function $h_k$, based on the minibatch $B^t$ at time t and the model for the $k^{th}$ client at time t and $q^{th}$ iteration, $\theta_k^{t,q}$. In line 16, carry out loss calculation (apply an appropriate loss function, which can be selected by the skilled artisan, to the server model at time t, the embeddings for each client, for y (the data labels/classes) contained in the minibatch). The skilled artisan can pick a suitable loss function heuristically; non-limiting examples include cross-entropy loss, mean square error, and the like. In line 17, determine partial derivatives (based on the server model at time t), and apply the local gradients to update the local model for q+1 (line 18). This can be done using standard neural network training techniques such as coordinate descent. If Q=1, the algorithm reduces to carrying out forward and backward propagation in every iteration with server communication at every round. Q can be increased above 1 based on heuristics/knowledge of the application and data set. In a non-limiting example, Q is increased to a value within the range from 5-10.

Excessively increasing Q may negatively impact convergence. In lines 15-18, the clients carry out forward and backward propagation. For forward propagation, the client finds the embedding and then feeds the embedding through the copy of the server model that it obtained in line 11. It finds the loss in line 16 and calculates the gradients in line 17. The weights of the local model are updated in line 18 by applying the gradients. This is done for Q iterations. At the end of Q iterations, the clients allow the actual server model to train. Since the weights have been updated, the embeddings for each client model are also updated. Each client model forms its updated embedding, and k-means clustering is carried out in line 20. The clustered embeddings $\Phi_k^{B^t}$ and cluster labels are sent to the server in line 21. The server now has the latest embeddings (as recreated in line 23 similar to line 10) on which to train in lines 24-28. In the non-limiting example of FIG. 3, the server also trains for Q iterations, which allows for faster training with reduced need for client-server communication. Lines 21 and 23 are analogous to lines 8 and 10, lines 8 and 10 being with the initial embeddings and lines 21 and 23 being with the updated embeddings. The value of Q for the server need not necessarily be the same as the value of Q for the clients, and the different clients need not necessarily have the same Q values as each other.

Thus, in line 20, perform K-means clustering to compress the upstream data, and in line 21, send the clustered embeddings and labels to the server. In line 23, the server recreates the updated overall model embeddings from those for the individual clients using the cluster information. In the FOR-NEXT loop from lines 24-29, calculate the loss and partial derivatives, and apply the local gradients. In line 25, carry out loss calculation (apply an appropriate loss function (see discussion above), which can be selected by the skilled artisan, to the server model at time t, iteration q, the overall embedding, for y contained in the minibatch). In line 26, determine partial derivatives (based on the server model at time t, iteration q), and apply the local gradients to update the local model for q+1 (line 18). Again, this can be done using standard neural network training techniques such as coordinate descent.

At the end of T rounds, sufficient training has been carried out such that the federated model can be used to achieve accurate classification/inference. The value of T can be selected heuristically, or the calculated loss can be tracked, and the calculations stopped when the loss falls below an acceptable threshold (such that acceptable performance/accuracy is achieved) or does not meaningfully change between successive rounds/time steps. Thus, the pseudo code indicates T time steps, but T may not be fixed a priori but rather determined dynamically during the calculations, as described.

Experiments

Experiments were carried out with two workers 103 and one server 101, for binary classification of in-hospital mortality rate prediction, using a publicly available anonymized hospital database. The workers 103 used a long short-term memory (LSTM) model, while the server model employed two Fully Connected (FC) layers and a SoftMax output. A batch size of 128 was employed, and the number of clusters in a batch varied over the values 16 (i.e., send 16 embeddings), 32, and 64 (i.e., cut the amount of data sent up to the server by ½). The "no clustering" case was when there was no clustering, and all 128 data points were transmitted. In our experiments, we plotted the loss on all training data points at the end of every epoch; i.e., one iteration through the whole dataset with a given batch size, as calculating this for every batch is very expensive.

Figure 4:
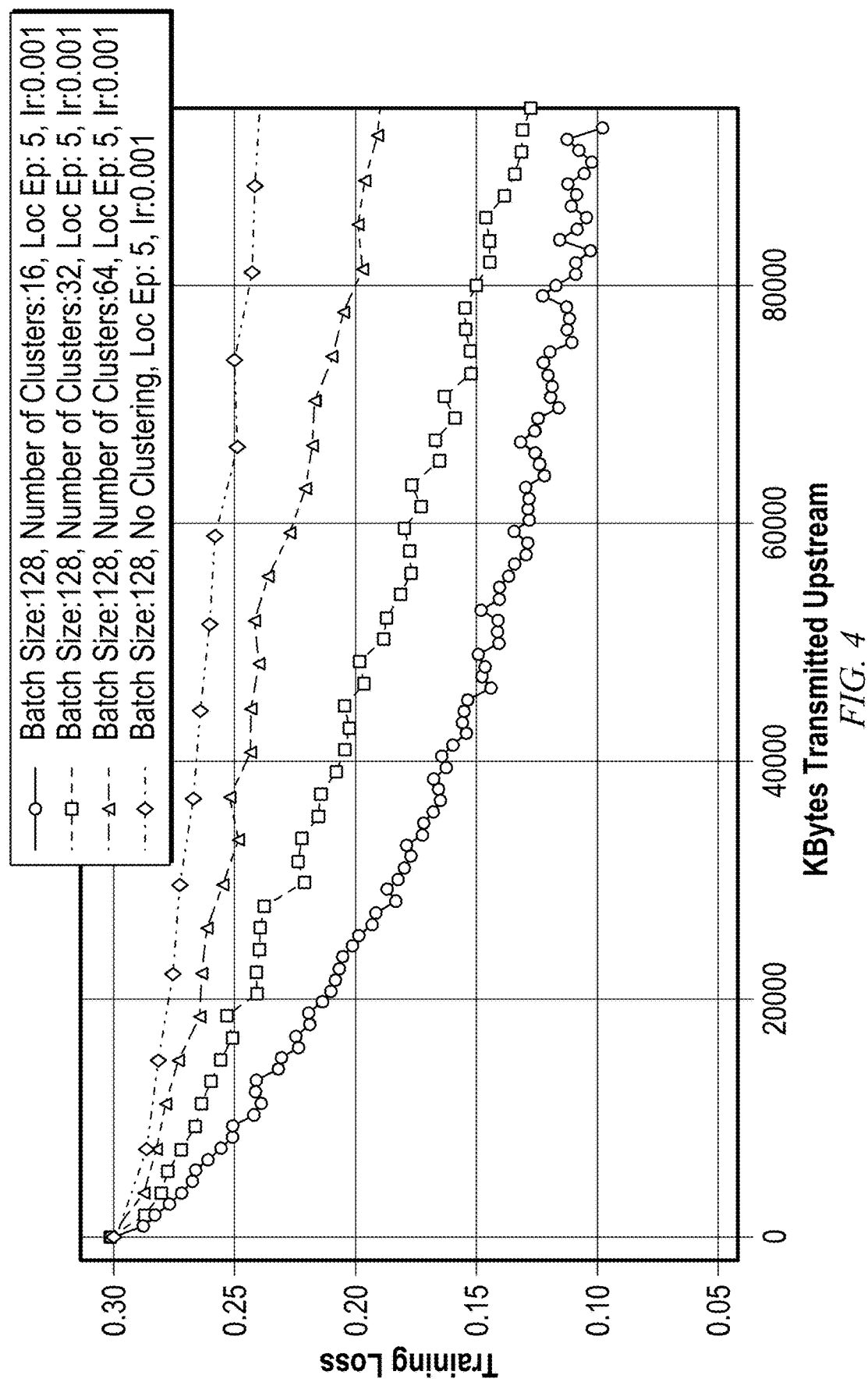
FIG. 4 presents a plot of exemplary training loss versus amount of data transmitted upstream, according to an aspect of the invention.

In our experiments, the server 101 and workers 103 each trained locally for five epochs (Q=5). In FIG. 4, the X-axis plots the number of batches seen (number of kilobytes transmitted upstream) and the Y-axis shows the average training loss for a batch. The embeddings transmitted upstream are compressed (except for the no clustering case, for which the reduction in training loss, and thus convergence, is slowest). The convergence is faster for cluster size 64, still faster for cluster size 32, and fastest for cluster size 16. Stated differently, for a fixed amount of data sent upstream, the examples with smaller cluster size, and thus more data compression, are able to do more rounds of training and thus converge faster. The exemplary results depicted are an average over three runs with different seeds. In one or more embodiments, the number of bytes transmitted is calculated offline by looking at the number of times the algorithm is executed, and the number of float point numbers/integer numbers transmitted. For each batch, there are two upstream transmissions. For a single transmission of batch size 128, the total number of bytes transmitted is determined as follows:

Total bytes transmitted=
(embedding_size*number_of_clusters*
64+batch_size*6)/(1024*8) bytes.

In the above, the factor of 6 is the log to the base 2 of 128.

Still referring to FIG. 4, all cases were trained until ~95000 KB data was transmitted. Approximately 95000 KB was transmitted upstream by the Cluster size 16 configuration by the end of 100 epochs. In looking at the convergence of different clustering settings for the same amount of bytes transferred, it can be seen that with the same number of bytes transferred, as the number of clusters is decreased, the convergence rate gets better. This is because, with same number of bytes transferred, the number of training rounds (as observed by the dots in FIG. 4) increases with increasing compression.

Figure 5:
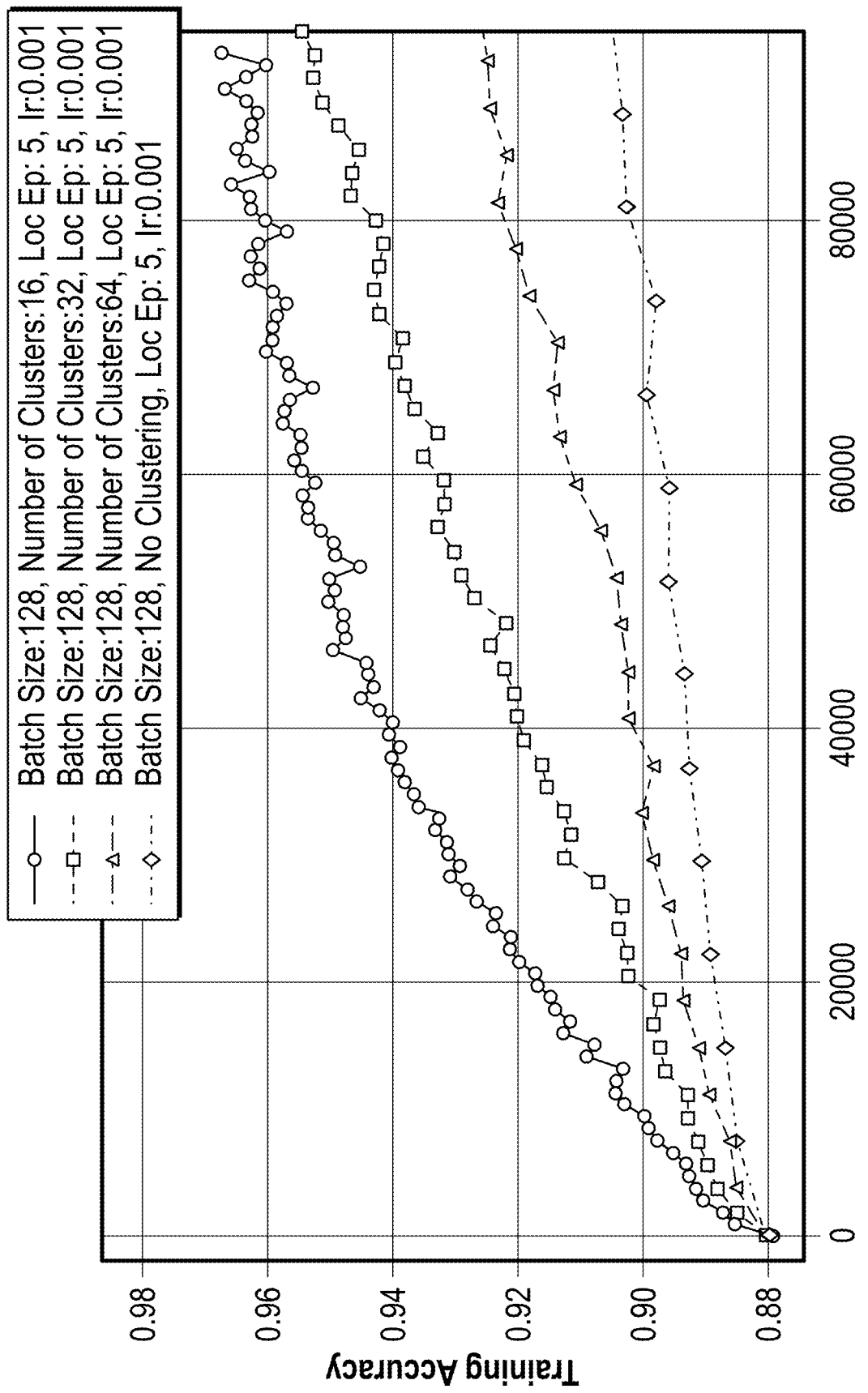
FIG. 5 presents a plot of exemplary training accuracy versus amount of data transmitted upstream, according to an aspect of the invention.

Turning now to FIG. 5, in looking at the training accuracy (essentially the opposite of the training loss shown in FIG. 4) of different clustering settings for the same number of bytes transferred, it can be seen that with same number of bytes transferred, as the number of clusters is decreased, the accuracy goes up. This is because, with the same number of bytes transferred, the number of training rounds (as observed by the dots in FIG. 5) increases with increasing compression, so higher accuracy is achieved faster.

Figure 6:
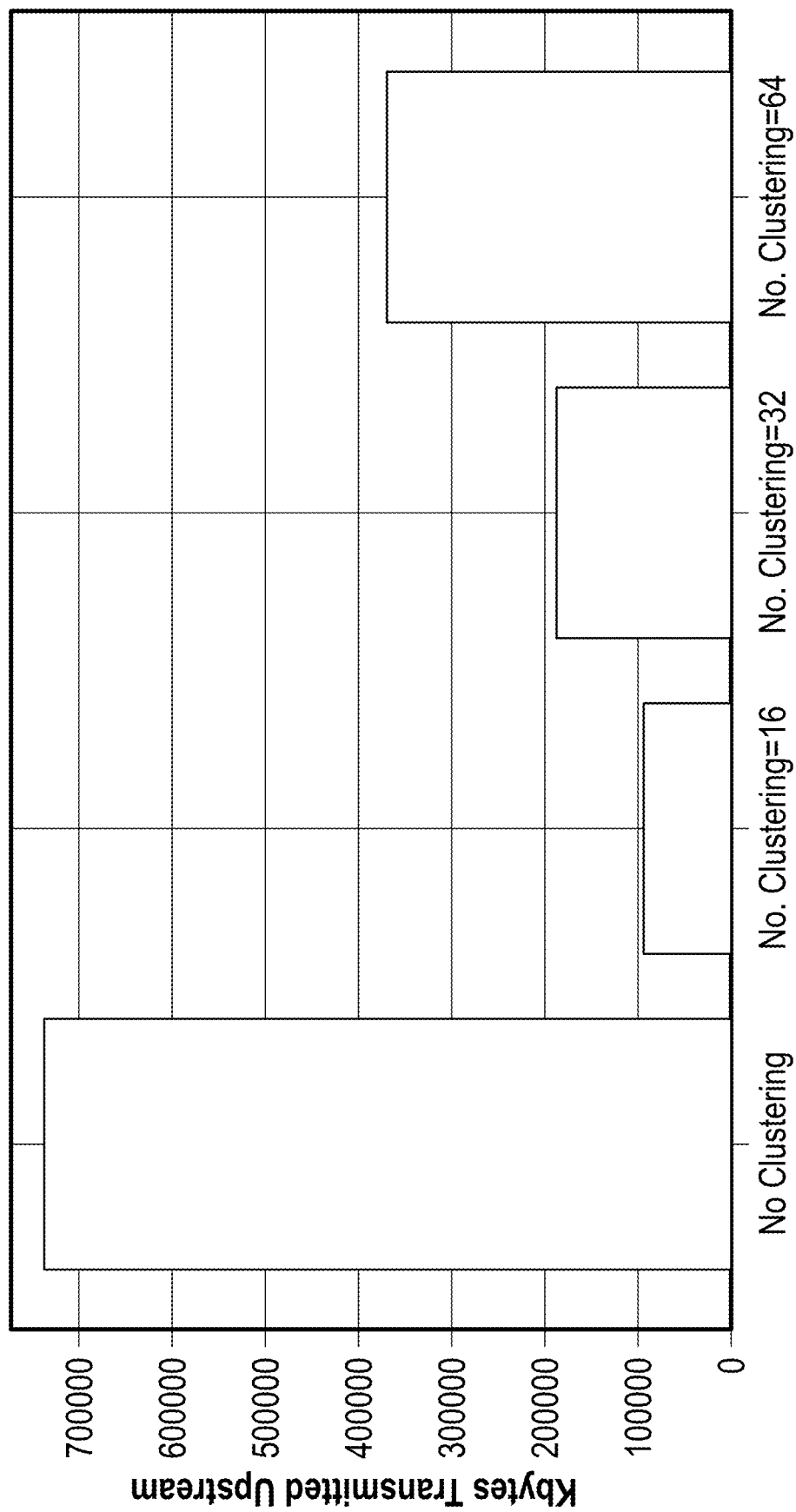
FIG. 6 presents a bar graph of data transmitted upstream at the end of the training on 100 epochs versus clustering, according to an aspect of the invention.

FIG. 6 shows the number of bytes transmitted at the end of the training on one hundred epochs. It can be seen that the number of kilobytes transmitted increases as the number of "embeddings" transmitted increases. In the example, all cases were trained up to 100 epochs (T=100), with 115 batches per epoch. With no clustering, somewhat more than about 700 Mbytes needs to be sent upstream. For 16 clusters, only about 90 Mbytes needs to be sent upstream; for 32 clusters, about 180 Mbytes, and for 64 clusters, about 380 Mbytes (roughly half the amount for no clustering).

It will thus be appreciated that one or more embodiments provide a vertical federated learning system that includes multiple clients and a server, where the clients 103 and the server 101 exchange compressed embeddings. In one or more embodiments, the embeddings of the data samples (e.g., those in a mini-batch) are combined using a clustering approach. The cluster size can be determined, for example, based on the similarity of embeddings and their influence on further training.

In some instances, the embeddings are compressed by only sending the difference (optionally, after quantization) compared to what was sent before. The compression method can be designed such that user privacy is preserved according to a pre-defined metric. The compressed models can be sent both from the clients to the server and from the server to the clients.

One or more embodiments thus employ compressed embeddings that are exchanged between clients and the server, to reduce the communication overhead of vertical federated learning. One or more embodiments speed up the communication across multiple parties participating in vertical federated learning scheme. In addition, in one or more embodiments, the server also trains a part of the model.

One or more embodiments thus provide techniques for using a computing device to improve the efficiency of a federated learning scheme, including: receiving, by a central computing device in a federated learning scheme, a compressed embedding trained by a worker computer in the federated learning scheme. The compressed embedding is joinable with other compressed embeddings trained by other worker computers in the federated learning scheme. In the federated learning scheme, a federated learning model is trained collectively based upon all of the received compressed embeddings.

In some instances, the compressed embeddings are based on data samples accessed by each worker computer.

A variety of practical applications are possible. For example, a manufacturer and an end-user industrial company may have different information about the same piece of industrial equipment. The combination of such information can be used to predict the needed maintenance schedule for the piece of industrial equipment. A cloud (or other IT) platform managed by one company may store data of another company, or IT infrastructure may be managed by one company, but service may be provided by another company. Both companies store logs, one for infrastructure (how much bandwidth/storage is used) while the other stores logs regarding the service itself, such as how the service is working for different users and the states that have been transitioned to in the past. Thus, there are different sets of logs but for the same time period, and it is desired to train a predictive model to predict the future behavior of the IT service and infrastructure.

Given the discussion thus far, it will be appreciated that an exemplary method, according to an aspect of the invention, includes obtaining, for a plurality of client computing devices of a federated learning system, initial compressed embeddings and initial cluster labels corresponding to the initial compressed embeddings. The initial compressed embeddings are compressed by clustering, and include the output of initial local models for a current minibatch. Refer to line 8 of the pseudocode of FIG. 3. The cluster labels should not be confused with the labels in the training data. A further step includes recreating an initial overall embedding based on the initial compressed embeddings and the initial cluster labels obtained for the plurality of client computing devices. Refer to line 10 of the pseudocode of FIG. 3; this step can be done at the server or each client. A still further step includes, at the server of the federated learning system, sending a current version of a server model, to each of the plurality of client computing devices. Refer to line 11 of the pseudocode of FIG. 3.

An even further step includes, at the server of the federated learning system, obtaining, from the plurality of client computing devices of the federated learning system: updated compressed embeddings, the updated compressed embeddings being compressed by clustering, and updated cluster labels corresponding to the updated compressed embeddings—this is based on local training by the plurality of client computing devices of the federated learning system with the initial overall embedding and the current server model. Refer to line 21 of the pseudocode of FIG. 3. Yet a further step includes, at the server of the federated learning system, recreating an updated overall embedding based on the updated compressed embeddings and the corresponding updated cluster labels. Refer to line 23 of the pseudocode of FIG. 3. An additional step includes, at the server of the federated learning system, locally training the server model based on the updated overall embedding to obtain an updated version of the server model. Refer to lines 25-27 of the pseudocode of FIG. 3. It is worth noting that in one or more embodiments, the updated labels need only be used to obtain the updated overall embedding, which is then used to train and obtain the updated server model.

In one or more embodiments, the step of obtaining the initial compressed embeddings and the initial cluster labels, and the step of recreating the initial overall embedding, are carried out at the server, and the step of sending the current version of the server model, to each of the plurality of client computing devices further includes sending the initial overall embedding.

In one or more embodiments, the local training by the plurality of client computing devices produces updated local models, and a further step 303 includes carrying out federated machine learning inferencing with the updated version of the server model and the updated local models. In a non-limiting example, one practical application of the inferencing includes deploying information technology resources (see, e.g., FIGS. 7 and 8) in accordance with the inferencing, as at 305.

It is worth noting that in general, the clients and server can be controlled/operated by the same or different entities.

One or more embodiments further include, for the plurality of client computing devices of the federated learning system, determining the output of initial local models as an initial uncompressed embedding for the current minibatch. Each of the initial local models is based on a vertical slice of data. Refer to line 6 of the pseudocode of FIG. 3. Such embodiments also include, for the plurality of client computing devices of the federated learning system, compressing the initial uncompressed embeddings by the clustering to obtain the initial compressed embeddings (refer to line 7 of the pseudocode of FIG. 3); and, for the plurality of client computing devices of the federated learning system, sending the initial compressed embeddings, and initial cluster labels, to the server of the federated learning system (refer to line 8 of the pseudocode of FIG. 3). Such embodiments further include, for the plurality of client computing devices of the federated learning system, locally training the initial local models based on the initial overall embedding and the current server model to obtain the updated local models, wherein each of the updated local models is based on another vertical slice of data (refer to lines 15-18 of the pseudocode of FIG. 3); and, for the plurality of client computing devices of the federated learning system, sending the updated clustered embeddings, and corresponding updated cluster labels, based on the updated local models, to the server of the federated learning system (refer to lines 20-21 of the pseudocode of FIG. 3).

It is worth noting the significance of "another" vertical slice of data. In each round, the client only uses the data from that client, so in that sense it is the same slice of data. However, because of the updated minibatch sampling, it is not exactly the same data but rather a different set selected from the same slice associated with that client.

As noted, in one or more embodiments, the features are partitioned vertically across the clients 103, and the data samples have a shared key (for example, a numerical value unique to a person such as that person's social security number) and a shared label (e.g., a ground truth prediction result). In one or more embodiments, mini-batch sampling across clients 103 is synchronized via the shared key.

One or more embodiments further include repeating, until convergence, the steps of obtaining the initial compressed embeddings and the initial cluster labels, recreating the initial overall embedding, sending the current version of the server model, obtaining the updated compressed embeddings and the updated cluster labels, recreating the updated overall embedding, and locally training the server model to obtain the updated version of the server model. Refer to the FOR-END FOR loop of lines 3-29 in the pseudocode of FIG. 3. The value of T can be selected heuristically, or the calculated loss can be tracked, and the calculations stopped when the loss falls below an acceptable threshold (such that acceptable performance/accuracy is achieved) or does not meaningfully change between successive rounds/time steps. Thus, while the pseudo code indicates T time steps, T may not be fixed a priori but rather determined dynamically during the calculations, as described.

In one or more embodiments, when the steps are repeated (e.g., t=2) random sampling is carried out for the second iteration—again, randomly sample a subset of the whole dataset. In one or more embodiments, for every iteration, a different random sample of data points (minibatch) is used; the minibatch is different at every iteration. Therefore, in one or more embodiments, the minibatch $B^t$ and the model for the $k^{th}$ client at time t, $\theta_k^t$, are different at every round. The client and server models are iteratively updated, and this also changes the embeddings at each iteration.

In one or more embodiments, sending the updated clustered embeddings (line 21 of pseudocode of FIG. 3) includes sending differential updated clustered embeddings. As noted elsewhere, for example, the embeddings can be compressed by only sending the difference (optionally, after quantization) compared to what was sent before. The clustering and compression methods can also be designed such that user privacy is preserved according to some pre-defined metric.

In one or more embodiments, when repeating the sending of the current version of the server model, the current version of the server model is sent in a compressed form. That is, a compressed model is sent from the server to the clients in one or more embodiments; i.e., in one or more embodiments, downstream communication is also compressed.

In one or more embodiments, the clustering includes k-means clustering; k-means is a non-limiting example and clustering is a form of vector quantization.

One or more embodiments further include reducing the number of clusters in the clustering when repeating the steps of obtaining the initial compressed embeddings and the initial cluster labels, recreating the initial overall embedding, sending the current version of the server model, obtaining the updated compressed embeddings and the updated cluster labels, recreating the updated overall embedding, and locally training the server model to obtain the updated version of the server model. The cluster size can be determined based on the similarity of embeddings and their influence on further training (i.e., cluster size can be dynamically updated). For example, when features at a certain client are non-influential on the final prediction (e.g., all the embeddings from this client are the same or very similar), then it is sufficient to use a single vector to represent all the embeddings, i.e., the cluster size is 1. On the other hand, when features at a client are influential on the final prediction (i.e., the prediction result strongly depends on these features), the embeddings of different samples are likely to be very different, and it is appropriate to use a large cluster size.

The skilled artisan will appreciate that "K" is used for the number of clients and also the number of centroids in K-means clustering, and will apprehend the distinction from the context (of course, the number of clients and number of centroids are not necessarily the same). Dynamic aspects can include changing how many clusters are used in k-means clustering (i.e., how much compression). This can depend, for example, on bandwidth limitations. Consider that increasing the number of data points in a cluster reduces the number of clusters and compresses the data more; reducing the number of data points in a cluster means more clusters are needed and there is less compression but more accuracy. There may be fewer clusters, for example, as the end of training is approached. Of course, even without that occurring, there is already an element of dynamism since the clustering is typically changed for each iteration.

To pick an initial value for the number of clusters in k-means clustering, for example, use heuristics based on the characteristics of the data being analyzed and the size of the minibatch. For example, given an error bound, each client can determine k. Each client can use a different k if desired. Non-limiting examples are shown in the figures; e.g., FIGS. 4-6. In the example of FIGS. 4 and 5, the batch size was 128 and the number of clusters ranged from 16 to 64. Thus, by way of a non-limiting example, an upper bound on the number of clusters could be 50% of the batch size (64/128), while a lower bound on the number of clusters could be 12.5% of the batch size (16/128) or 6.25% of the batch size (8/128).

In one or more embodiments, the local training on the clients and the local training on the server are carried out for 5-10 iterations (i.e., Q=5-10). Note, however, that in some cases, Q can be much larger than 10 depending on the data diversity and learning rate. For example, Q could be 100.

Furthermore, Q=1 is a pertinent special case in some cases since the algorithm also works with a single local update. Thus, in some cases, Q=1 to 100. Q can vary among the clients, between the clients and the server, and between rounds.

In another aspect, a federated learning system includes (see, e.g., FIG. 9 and accompanying text and the pseudocode of FIG. 3 as discussed above) a memory embodying computer executable instructions, and at least one processor, coupled to the memory, and operative to execute the computer executable instructions to obtain, for a plurality of client computing devices 103, initial compressed embeddings, the initial compressed embeddings being compressed by clustering, the initial compressed embeddings including output of initial local models for a current minibatch, and initial cluster labels corresponding to the initial compressed embeddings. The at least one processor is further operative to execute the computer executable instructions to recreate an initial overall embedding based on the initial compressed embeddings and the initial cluster labels obtained from the plurality of client computing devices; to send a current version of a server model to each of the plurality of client computing devices; and to obtain, from the plurality of client computing devices: updated compressed embeddings, the updated compressed embeddings being compressed by clustering, and updated cluster labels corresponding to the updated compressed embeddings, based on local training by the plurality of client computing devices with the overall embedding and the current server model. The at least one processor is still further operative to execute the computer executable instructions to recreate an updated overall embedding based on the updated compressed embeddings and the corresponding updated cluster labels; and to locally train the server model based on the updated overall embedding to obtain an updated version of the server model.

In one or more embodiments, the memory and the at least one processor are distributed across the plurality of client computing devices and a server 101 coupled to the plurality of client computing devices; the local training by the plurality of client computing devices produces updated local models, and the plurality of client computing devices are configured to: determine the output of initial local models as an initial uncompressed embedding for the current minibatch; compress the initial uncompressed embeddings by the clustering to obtain the initial compressed embeddings; send the initial compressed embeddings, and initial cluster labels, to the server; locally train the initial local models based on the initial overall embedding and the current server model to obtain the updated local models; and send the updated clustered embeddings and corresponding updated cluster labels, based on the updated local models, to the server of the federated learning system. Furthermore, the server is configured to send the current version of a server model to each of the plurality of client computing devices, to obtain the updated compressed embeddings and the updated cluster labels from the plurality of client computing devices, and to locally train the server model.

It will be appreciated that the clients and server are so configured, for example, by the computer executable instructions implementing pertinent portions of the algorithm disclosed in the pseudocode.

In one or more embodiments, the server is configured to obtain the initial compressed embeddings and the initial cluster labels, and to recreate the initial overall embedding, and the server is configured to send the initial overall embedding with the current version of the server model.

In one or more embodiments, the server and the plurality of client computing devices are cooperatively configured to carry out federated machine learning inferencing with the updated version of the server model and the updated local models. One non-limiting exemplary practical application of such inferencing is to deploy information technology resources in accordance with the inferencing.

In some instances, the server and the plurality of client computing devices are further cooperatively configured to repeat, until convergence, the obtaining the initial compressed embeddings and the initial cluster labels, the recreating of the initial overall embedding, the sending of the current version of the server model, the obtaining of the updated compressed embeddings and the updated cluster labels, the recreating of the updated overall embedding, and the local training of the server model to obtain the updated version of the server model.

As noted, in some cases, the clustering includes k-means clustering. The server and the plurality of client computing devices can be further cooperatively configured to reduce a number of clusters in the clustering when repeating the obtaining the initial compressed embeddings and the initial cluster labels, the recreating of the initial overall embedding, the sending of the current version of the server model, the obtaining of the updated compressed embeddings and the updated cluster labels, the recreating of the updated overall embedding, and the local training of the server model to obtain the updated version of the server model.

In still another aspect, a computer program product (see, e.g., FIG. 9 and accompanying text and the pseudocode of FIG. 3 as discussed above) includes one or more computer readable storage media, and program instructions collectively stored on the one or more computer readable storage media; the program instructions include program instructions to obtain, for a plurality of client computing devices: initial compressed embeddings, the initial compressed embeddings being compressed by clustering, the initial compressed embeddings including output of initial local models for a current minibatch, and initial cluster labels corresponding to the initial compressed embeddings; program instructions to recreate an initial overall embedding based on the initial compressed embeddings and the initial cluster labels obtained from the plurality of client computing devices; program instructions to send a current version of a server model to each of the plurality of client computing devices; and program instructions to obtain, from the plurality of client computing devices: updated compressed embeddings, the updated compressed embeddings being compressed by clustering, and updated cluster labels corresponding to the updated compressed embeddings, based on local training by the plurality of client computing devices with the overall embedding and the current server model. The program instructions further include program instructions to recreate an updated overall embedding based on the updated compressed embeddings and the corresponding updated cluster labels; and program instructions to locally train the server model based on the updated overall embedding to obtain an updated version of the server model.

In some embodiments, the program instructions are executed cooperatively by the plurality of client computing devices 103 and a server 101 coupled to the plurality of client computing devices; and the local training by the plurality of client computing devices produces updated local models. The program instructions further include: program instructions to configure the plurality of client computing devices to determine the output of initial local models as an initial uncompressed embedding for the current minibatch;

program instructions to configure the plurality of client computing devices to compress the initial uncompressed embeddings by the clustering to obtain the initial compressed embeddings; program instructions to configure the plurality of client computing devices to send the initial compressed embeddings, and initial cluster labels, to the server; program instructions to configure the plurality of client computing devices to locally train the initial local models based on the initial overall embedding and the current server model to obtain the updated local models; and program instructions to configure the plurality of client computing devices to send the updated clustered embeddings and corresponding updated cluster labels, based on the updated local models, to the server of the federated learning system. The program instructions still further include program instructions to configure the server to send the current version of the server model to each of the plurality of client computing devices, to obtain the updated compressed embeddings and the updated cluster labels from the plurality of client computing devices, and to locally train the server model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
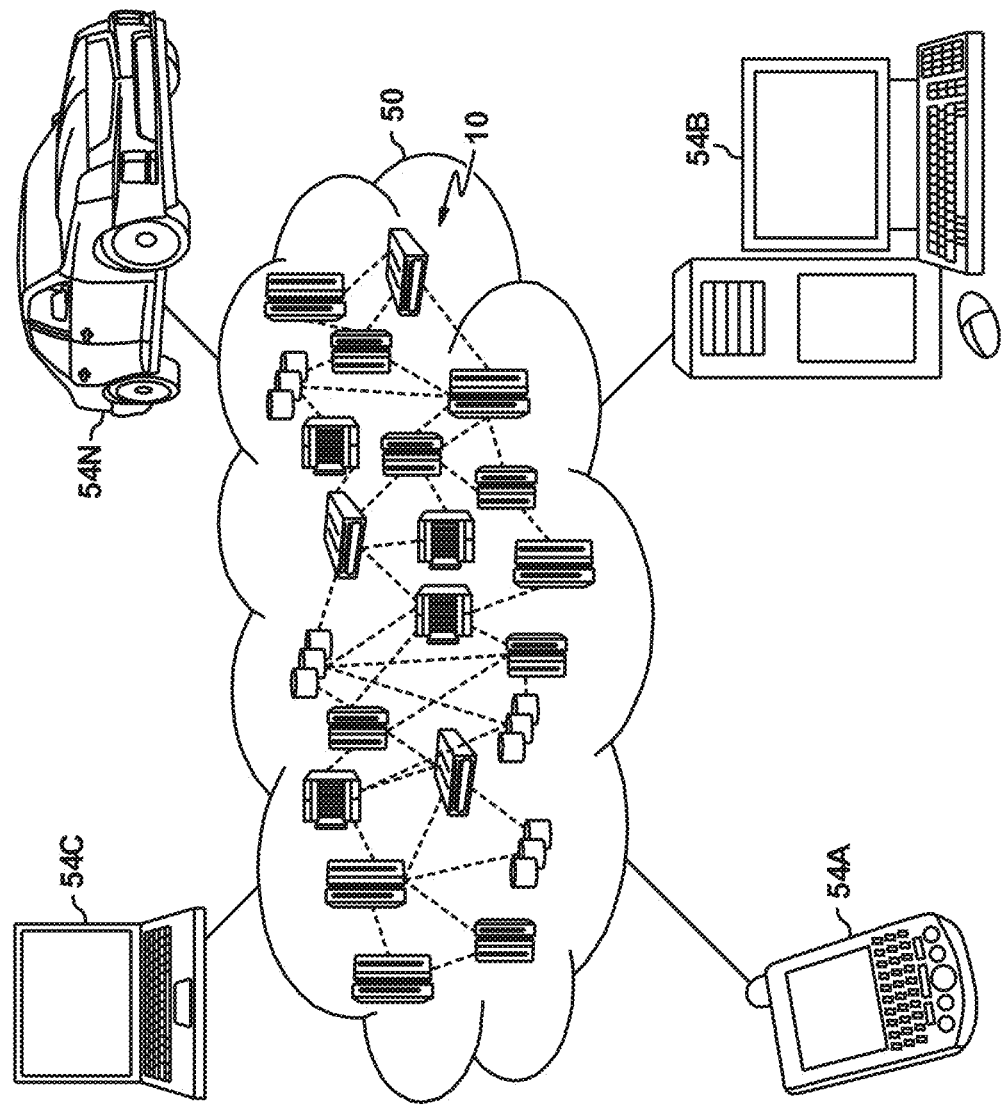
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
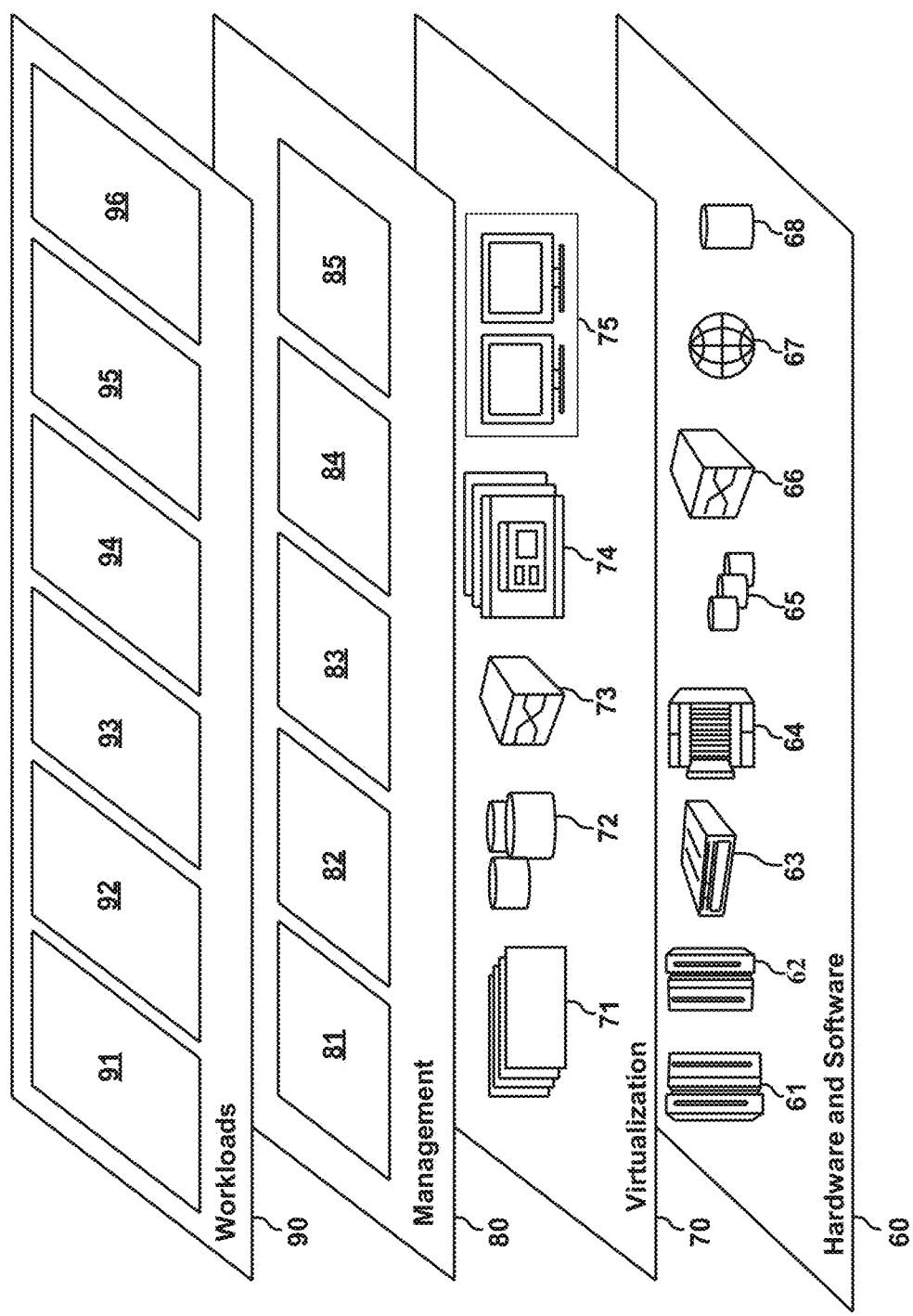
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a system for vertical federated learning with compressed embeddings 96 (e.g., server 101 thereof).

Figure 9:
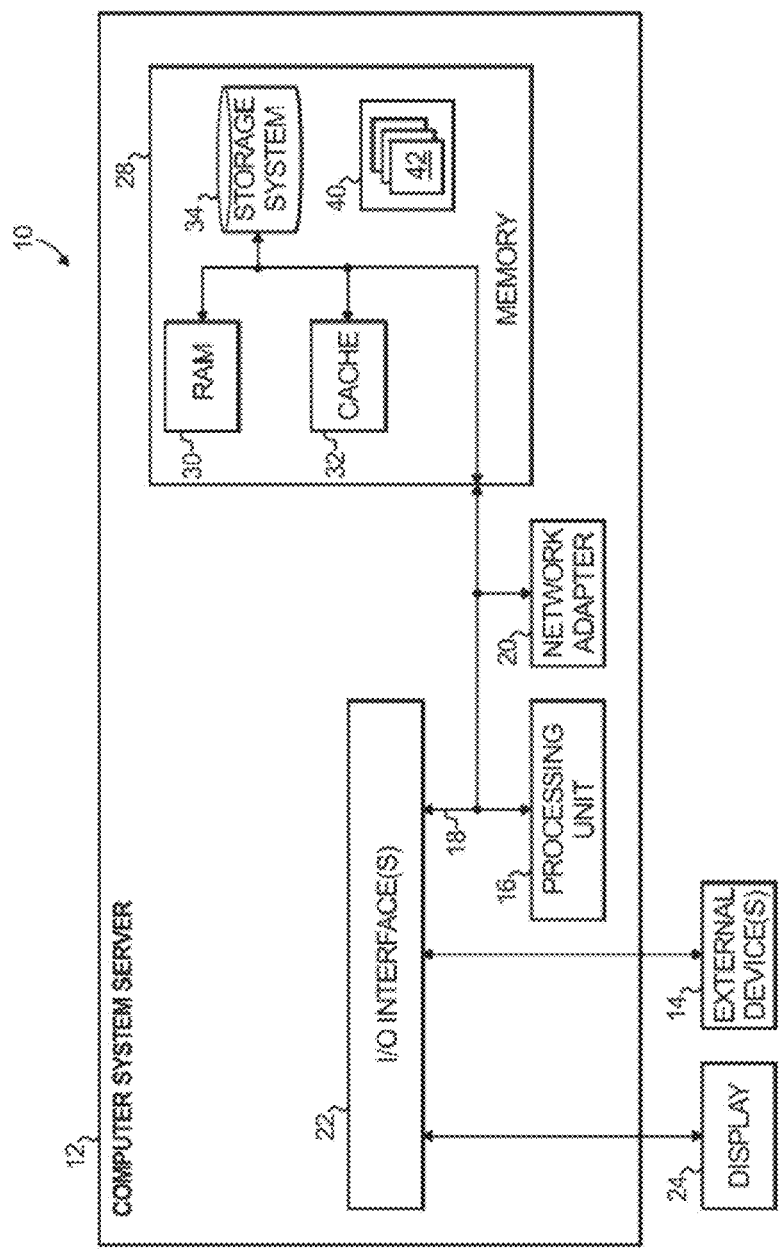
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 7-8 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and/or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining, for a plurality of client computing devices of a federated learning system:
initial compressed embeddings, said initial compressed embeddings being compressed by clustering, said initial compressed embeddings comprising output of initial local models for a current minibatch, and
initial cluster labels corresponding to said initial compressed embeddings;
recreating an initial overall embedding based on said initial compressed embeddings and said initial cluster labels obtained for said plurality of client computing devices;
at a server of said federated learning system, sending a current version of a server model, to each of said plurality of client computing devices;
at said server of said federated learning system, obtaining, from said plurality of client computing devices of said federated learning system:
updated compressed embeddings, said updated compressed embeddings being compressed by clustering, and
updated cluster labels corresponding to said updated compressed embeddings,
based on local training by said plurality of client computing devices of said federated learning system with said initial overall embedding and said current server model;
at said server of said federated learning system, recreating an updated overall embedding based on said updated compressed embeddings and said corresponding updated cluster labels; and
at said server of said federated learning system, locally training said server model based on said updated overall embedding to obtain an updated version of said server model.

2. The method of claim 1, wherein said step of obtaining said initial compressed embeddings and said initial cluster labels, and said step of recreating said initial overall embedding, are carried out at said server, and wherein said step of sending said current version of said server model, to each of said plurality of client computing devices further comprises sending said initial overall embedding.

3. The method of claim 2, wherein said local training by said plurality of client computing devices produces updated local models, further comprising carrying out federated machine learning inferencing with said updated version of said server model and said updated local models.

4. The method of claim 3, further comprising deploying information technology resources in accordance with said inferencing.

5. The method of claim 3, further comprising:
for said plurality of client computing devices of said federated learning system, determining said output of initial local models as an initial uncompressed embedding for said current minibatch, wherein each of said initial local models is based on a vertical slice of data;
for said plurality of client computing devices of said federated learning system, compressing said initial uncompressed embeddings by said clustering to obtain said initial compressed embeddings;
for said plurality of client computing devices of said federated learning system, sending said initial compressed embeddings, and initial cluster labels, to said server of said federated learning system;
for said plurality of client computing devices of said federated learning system, locally training said initial local models based on said initial overall embedding and said current server model to obtain said updated local models, wherein each of said updated local models is based on another vertical slice of data; and
for said plurality of client computing devices of said federated learning system, sending said updated clustered embeddings, and corresponding updated cluster labels, based on said updated local models, to said server of said federated learning system.

6. The method of claim 5, further comprising repeating, until convergence, said steps of obtaining said initial compressed embeddings and said initial cluster labels, recreating said initial overall embedding, sending said current version of said server model, obtaining said updated compressed embeddings and said updated cluster labels, recreating said updated overall embedding, and locally training said server model to obtain said updated version of said server model.

7. The method of claim 6, wherein sending said updated clustered embeddings comprises sending differential updated clustered embeddings.

8. The method of claim 7, wherein, when repeating said sending of said current version of said server model, said current version of said server model is sent in a compressed form.

9. The method of claim 6, wherein said clustering comprises k-means clustering.

10. The method of claim 9, further comprising reducing a number of clusters in said clustering when repeating said steps of obtaining said initial compressed embeddings and said initial cluster labels, recreating said initial overall embedding, sending said current version of said server model, obtaining said updated compressed embeddings and said updated cluster labels, recreating said updated overall embedding, and locally training said server model to obtain said updated version of said server model.

11. The method of claim 5 wherein said local training on said clients and said local training on said server are carried out for 5-10 iterations.

12. A federated learning system comprising:
a memory embodying computer executable instructions, and at least one processor, coupled to the memory, and operative to execute the computer executable instructions to:
obtain, for a plurality of client computing devices:
initial compressed embeddings, said initial compressed embeddings being compressed by clustering, said initial compressed embeddings comprising output of initial local models for a current minibatch, and
initial cluster labels corresponding to said initial compressed embeddings;
recreate an initial overall embedding based on said initial compressed embeddings and said initial cluster labels obtained from said plurality of client computing devices;
send a current version of a server model to each of said plurality of client computing devices;
obtain, from said plurality of client computing devices:
updated compressed embeddings, said updated compressed embeddings being compressed by clustering, and
updated cluster labels corresponding to said updated compressed embeddings, based on local training by said plurality of client computing devices with said overall embedding and said current server model;
  recreate an updated overall embedding based on said updated compressed embeddings and said corresponding updated cluster labels; and
  locally train said server model based on said updated overall embedding to obtain an updated version of said server model.

13. The federated learning system of claim 12, wherein:
said memory and said at least one processor are distributed across said plurality of client computing devices and a server coupled to said plurality of client computing devices;
said local training by said plurality of client computing devices produces updated local models, and said plurality of client computing devices are configured to:
  determine said output of initial local models as an initial uncompressed embedding for said current minibatch;
  compress said initial uncompressed embeddings by said clustering to obtain said initial compressed embeddings;
  send said initial compressed embeddings, and initial cluster labels, to said server;
  locally train said initial local models based on said initial overall embedding and said current server model to obtain said updated local models; and
  send said updated clustered embeddings and corresponding updated cluster labels, based on said updated local models, to said server of said federated learning system; and
said server is configured to send said current version of a server model to each of said plurality of client computing devices, to obtain said updated compressed embeddings and said updated cluster labels from said plurality of client computing devices, and to locally train said server model.

14. The federated learning system of claim 13, wherein said server is configured to obtain said initial compressed embeddings and said initial cluster labels, and to recreate said initial overall embedding, and wherein said server is configured to send said initial overall embedding with said current version of said server model.

15. The federated learning system of claim 14, wherein said server and said plurality of client computing devices are cooperatively configured to carry out federated machine learning inferencing with said updated version of said server model and said updated local models.

16. The federated learning system of claim 15, wherein said server and said plurality of client computing devices are further cooperatively configured to deploy information technology resources in accordance with said inferencing.

17. The federated learning system of claim 15, wherein said server and said plurality of client computing devices are further cooperatively configured to repeat, until convergence, said obtaining said initial compressed embeddings and said initial cluster labels, said recreating of said initial overall embedding, said sending of said current version of said server model, said obtaining of said updated compressed embeddings and said updated cluster labels, said recreating of said updated overall embedding, and said local training of said server model to obtain said updated version of said server model.

18. The federated learning system of claim 17, wherein said clustering comprises k-means clustering and wherein said server and said plurality of client computing devices are further cooperatively configured to reduce a number of clusters in said clustering when repeating said obtaining said initial compressed embeddings and said initial cluster labels, said recreating of said initial overall embedding, said sending of said current version of said server model, said obtaining of said updated compressed embeddings and said updated cluster labels, said recreating of said updated overall embedding, and said local training of said server model to obtain said updated version of said server model.

19. A computer program product comprising one or more computer readable storage media, and program instructions collectively stored on the one or more computer readable storage media, the program instructions comprising:
program instructions to obtain, for a plurality of client computing devices:
  initial compressed embeddings, said initial compressed embeddings being compressed by clustering, said initial compressed embeddings comprising output of initial local models for a current minibatch, and
  initial cluster labels corresponding to said initial compressed embeddings;
program instructions to recreate an initial overall embedding based on said initial compressed embeddings and said initial cluster labels obtained from said plurality of client computing devices;
program instructions to send a current version of a server model to each of said plurality of client computing devices;
program instructions to obtain, from said plurality of client computing devices:
  updated compressed embeddings, said updated compressed embeddings being compressed by clustering, and
  updated cluster labels corresponding to said updated compressed embeddings,
based on local training by said plurality of client computing devices with said overall embedding and said current server model;
program instructions to recreate an updated overall embedding based on said updated compressed embeddings and said corresponding updated cluster labels; and
program instructions to locally train said server model based on said updated overall embedding to obtain an updated version of said server model.

20. The computer program product of claim 19, wherein:
said program instructions are executed cooperatively by said plurality of client computing devices and a server coupled to said plurality of client computing devices;
said local training by said plurality of client computing devices produces updated local models, further comprising:
  program instructions to configure said plurality of client computing devices to determine said output of initial local models as an initial uncompressed embedding for said current minibatch;
  program instructions to configure said plurality of client computing devices to compress said initial uncompressed embeddings by said clustering to obtain said initial compressed embeddings;
  program instructions to configure said plurality of client computing devices to send said initial compressed embeddings, and initial cluster labels, to said server;
  program instructions to configure said plurality of client computing devices to locally train said initial local models based on said initial overall embedding and said current server model to obtain said updated local models; and program instructions to configure said plurality of client computing devices to send said updated clustered embeddings and corresponding updated cluster labels, based on said updated local models, to said server of said federated learning system; and program instructions to configure said server to send said current version of said server model to each of said plurality of client computing devices, to obtain said updated compressed embeddings and said updated cluster labels from said plurality of client computing devices, and to locally train said server model.

* * * * *